(12) United States Patent
Birau et al.

(10) Patent No.: US 8,545,612 B1
(45) Date of Patent: Oct. 1, 2013

(54) PHASE CHANGE INK COMPOSITIONS AND SULFONATED COMPOUNDS FOR USE IN THE SAME

(75) Inventors: Mihaela Maria Birau, Mississauga (CA); Salma Falah Toosi, Mississauga (CA); C. Geoffrey Allen, Waterdown (CA); Biby Abraham, Mississauga (CA); James D. Mayo, Mississauga (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/453,916

(22) Filed: Apr. 23, 2012

(51) Int. Cl.
*C09D 11/02* (2006.01)
*C09D 11/12* (2006.01)
*B05D 5/00* (2006.01)
*C08K 5/20* (2006.01)

(52) U.S. Cl.
USPC ............ 106/31.29; 106/31.13; 106/31.6; 106/31.77; 427/256

(58) Field of Classification Search
None
See application file for complete search history.

(56) References Cited

U.S. PATENT DOCUMENTS

| | | |
|---|---|---|
| 5,195,430 A | 3/1993 | Rise |
| 5,389,958 A | 2/1995 | Bui |
| 5,782,966 A | 7/1998 | Bui |
| 6,309,453 B1 | 10/2001 | Banning |
| 6,858,070 B1 * | 2/2005 | Wong et al. ............ 106/31.61 |
| 6,860,930 B2 | 3/2005 | Wu |
| 7,186,762 B2 | 3/2007 | Wong |
| 7,973,186 B1 | 7/2011 | Goredema |

* cited by examiner

*Primary Examiner* — Yun Qian
(74) *Attorney, Agent, or Firm* — Pillsbury Winthrop Shaw Pittman LLP (57) ABSTRACT

A phase change ink composition, comprising an anti-drool additive to prevent and/or reduce printhead and nozzle contamination in ink jet printers caused by drooling and fouling of the faceplate by the ink. In particular, there is provided sulfonated small molecules for use in phase change ink compositions and which are compatible with phase change ink components.

13 Claims, 2 Drawing Sheets

PHASE CHANGE INK COMPOSITIONS AND SULFONATED COMPOUNDS FOR USE IN THE SAME

BACKGROUND

The present embodiments relate generally to phase change ink compositions, and in particular, sulfonated small molecules for use in phase change ink compositions to prevent and/or reduce printhead and nozzle contamination in ink jet printers caused by drooling and faceplate staining. Phase change ink or solid ink compositions are characterized by being solid at room temperature and molten at an elevated temperature at which the molten ink is applied to a substrate. These phase change ink compositions generally comprise an ink vehicle and a colorant, and can be used for ink jet printing.

Phase change ink or solid ink printers conventionally receive ink in a solid form, which is sometimes referred to as ink sticks. The ink sticks are typically inserted through an insertion opening of an ink loader for the printer and are moved by a feed mechanism and/or gravity toward a heater plate. The heater plate melts the phase change ink impinging on the plate into a liquid that is delivered to a printhead assembly for jetting onto a recording medium. The recording medium is typically paper or a liquid layer supported by an intermediate imaging member, such as a metal drum or belt.

A printhead assembly of a phase change ink printer typically includes one or more printheads each having a plurality of ink jets from which drops of melted phase change ink are ejected towards the recording medium. The ink jets of a printhead receive the melted ink from an ink supply chamber, or manifold, in the printhead which, in turn, receives ink from a source, such as a melted ink reservoir or an ink cartridge. Each ink jet includes a channel having one end connected to the ink supply manifold. The other end of the ink channel has an orifice, or nozzle, for ejecting drops of ink. The nozzles of the ink jets may be formed in an aperture, or nozzle plate that has openings corresponding to the nozzles of the ink jets. During operation, drop ejecting signals activate actuators in the ink jets to expel drops of fluid from the ink jet nozzles onto the recording medium. By selectively activating the actuators of the ink jets to eject drops as the recording medium and/or printhead assembly are moved relative to each other, the deposited drops can be precisely patterned to form particular text and graphic images on the recording medium.

One difficulty faced by fluid ink jet systems is that organic pigments and dyes used in the phase change inks show drooling behavior and faceplate staining in the printhead. Drooling is defined as the burst of the ink out of the printhead when pressure is applied and is expressed in inches water in the Low Pressure Assist cycle (LPA). Staining represents the fouling of the faceplate by the ink.

A synergist or a pigment stabilizer is a compound that promotes the adsorption of the polymeric dispersant onto the pigment. For example, in the case of a cationic dispersant, the dispersant anchor is comprised of a positive charge and will interact with an anionic group present on the synergist, exchanging counter ions and promote an anchoring of the dispersant onto the modified pigment surface. Solid inks containing a pigment/dispersant package show drooling behavior and faceplate staining in the printhead, even at low applied pressures and in some cases, such pigmented inks show auto-drooling behavior which is an extremely undesirable property of an ink. Changing pigments, dispersants, and the use of synergist with the pigment to enable dispersion stabilization did not successfully improve drooling and staining.

Experimental trials indicated that one approach for solving drool and staining of the faceplate by solid ink could be use of compounds containing acid groups. Commercially available compounds, however, tend to be very polar in nature and cannot be used as such compounds exhibit a strong gelling behavior in solid ink. For example inks prepared with commercially available synergists SOLSPERSE 5000 (a derivatized sulfonated copper phthalocyanine) and SOLSPERSE 22000 (a derivatized sulfonated analog of Pigment Yellow 12) at nominal ink loadings below 1% by weight (with no pigment added) showed no drooling or staining behavior. However, when the synergist loading was increased at or above 2.5% wt (with no pigment added), the inks displayed strong gelling behavior.

Because these commercially available synergists cannot be used as colorants or as anti-drooling additives, there is a need for finding other compounds containing acid functional groups to address the problems discussed above while being compatible for use in phase change inks.

SUMMARY

According to embodiments illustrated herein, there is provided a phase change ink composition comprising: a colorant; an ink vehicle; and an anti-drool additive, wherein the anti-drool additive is a sulfonated compound having one or more sulfonic acid groups and a N-alkyl or N-aryl counterion that is quaternary ammonium $NH_4$ or an alkyl or aryl quaternary ammonium selected from the group consisting of tetrabutylammonium, tetraoctylammonium, tetradodecylammonium, tetraoctadecylammonium, N,N-dimethyl dioctadecyl, N,N-dimethyl dioctyl, N,N-dimethyl didecyl, and mixtures thereof, and further wherein the anti-drool additive is soluble in the wax ink vehicle.

In particular, the present embodiments provide a phase change ink composition comprising: a colorant; an ink vehicle; and an anti-drool additive, wherein the anti-drool additive is a compound selected from the group consisting of and mixtures thereof.

In further embodiments, there is provided a phase change ink composition comprising: a colorant; an ink vehicle; and an anti-drool additive being soluble in the wax ink vehicle, wherein the anti-drool additive is a sulfonated compound having one or more sulfonic acid groups and a $NH_4$ or a N-alkyl or N-aryl quaternary ammonium counterion that is selected from the group consisting of tetramethylammonium, tetraethylammonium, tetrapropylammonium, tetrabutylammonium, tetrapentylammonium, tetrahexylammonium, tetraheptylammonium, tetraoctylammonium, tetranonylammonium, tetradecylammonium, tetradodecylammonium, tetraoctadecylammonium, N,N-dimethyl dioctadecyl, N,N-dimethyl dioctyl, N,N-dimethyl didecyl, and mixtures thereof, and further wherein the phase change ink has a Δ (Drool Pressure) in a printer of from about 1.5 inches of water to about 6.0 inches of water.

BRIEF DESCRIPTION OF THE DRAWINGS

For a better understanding of the present embodiments, reference may be made to the accompanying figures.

DETAILED DESCRIPTION

In the following description, it is understood that other embodiments may be utilized and structural and operational changes may be made without departure from the scope of the present embodiments disclosed herein. Phase change ink technology broadens printing capability and customer base across many markets, and the diversity of printing applications will be facilitated by effective integration of printhead technology, print process and ink materials. The phase change ink compositions are characterized by being solid at room temperature and molten at an elevated temperature at which the molten ink is applied to a substrate. However, phase change ink systems also experience problems during performance at other temperatures including at jetting temperature. For example, organic pigments and dyes used in phase change inks can exhibit drooling behavior and faceplate staining on the front face of the printhead.

Drooling is defined as the burst of the ink out of the printhead whether pressure is applied or not. For purposes of quantifying drool, it is convenient to express drool of a given test ink sample against a non-drooling reference such as the ink base without any colorant and/or dispersant. The relationship below defines the level of drool for a given test ink.

Δ(Drool Pressure)=Drool Pressure(sample)−Drool Pressure(reference)

It is desirable to have as small as possible a delta drool pressure of a given ink such that optimum jetting and print performance can be realized.

The gauge pressure is that measured pressure realized in the printer's Low Pressure Assist cycle above atmospheric pressure. Drool pressure of a sample ink is the gauge pressure realized that causes the ink to burst out of at least some of the nozzles in the printhead which can be accurately measured by a micropressure gauge. Drooling of inks in a printhead complicate the jetting process due to undesirable inter-nozzle color mixing as well as resulting in the undesirable depletion of ink from the ink loader. Drool pressure of a reference ink is that gauge pressure realized that causes the reference ink to burst out of at least some of the nozzles in the printhead which can be measured by a micropressure gauge. Typically this pressure value satisfies the requirements for successful jetting over the many purge and wipe cleaning cycles that occurs over the lifetime of the printer. Staining of the printhead is the undesirable fouling of the faceplate by an ink, or at least a portion of an ink, which can be qualitatively assessed through visual observation. For example, staining can be seen as ink smeared on the surface of the faceplate. Thus a desirable observation is when little or no ink is observed on the faceplate. A printhead that has been very undesirably compromised by staining from an ink, or a portion of an ink, will likely be more prone to ink drooling at even lower applied pressures during the course of the printer's normal purge and wipe cleaning cycles. In the present embodiments, there is provided a phase change ink composition that has a drool pressure in a printer of at least 1.5 inches of water. In further embodiments, the composition has a drool pressure in of from about 1.5 inches of water to about 6.0 inches of water or of from about 2.8 inches of water to about 6.0 inches of water.

Figure 1:
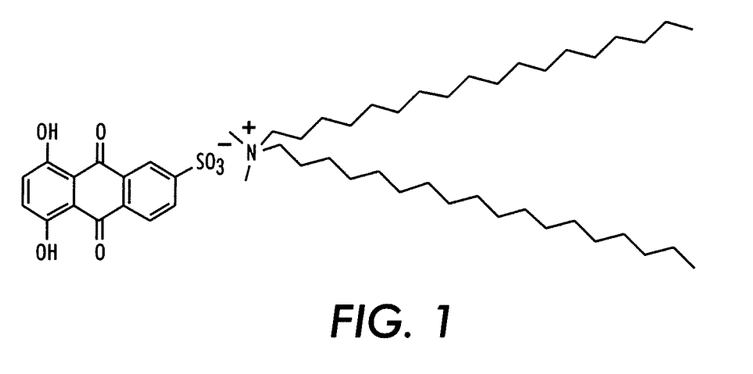
FIG. 1 illustrates an example of a domesticated sulfonated small molecule according to the present embodiments.
Figure 2:
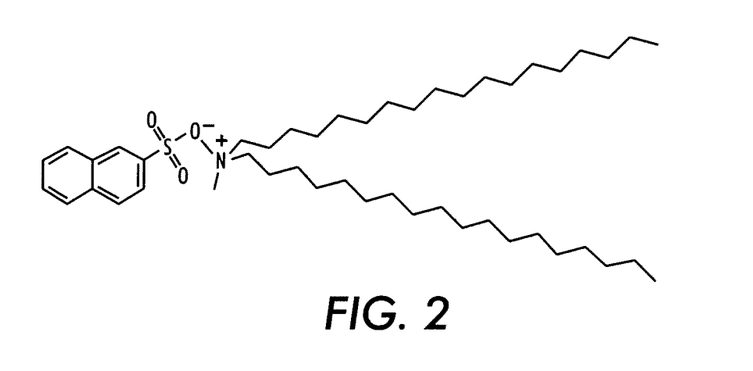
FIG. 2 illustrates a second example of a domesticated sulfonated small molecule according to the present embodiments.
Figure 3:
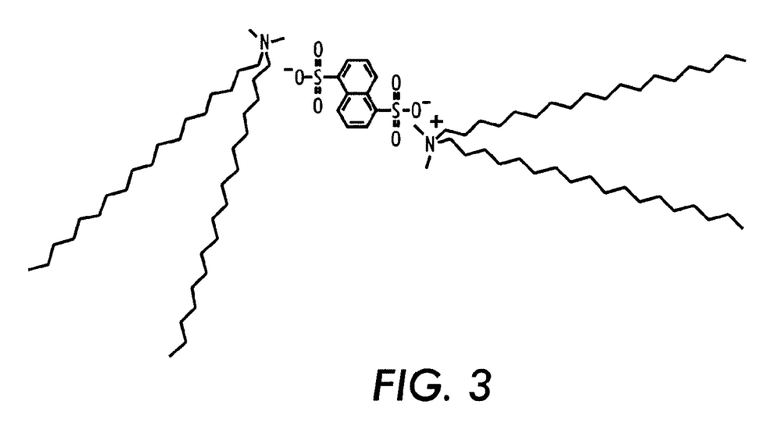
FIG. 3 illustrates a third example of a domesticated sulfonated small molecule according to the present embodiments.
Figure 4:
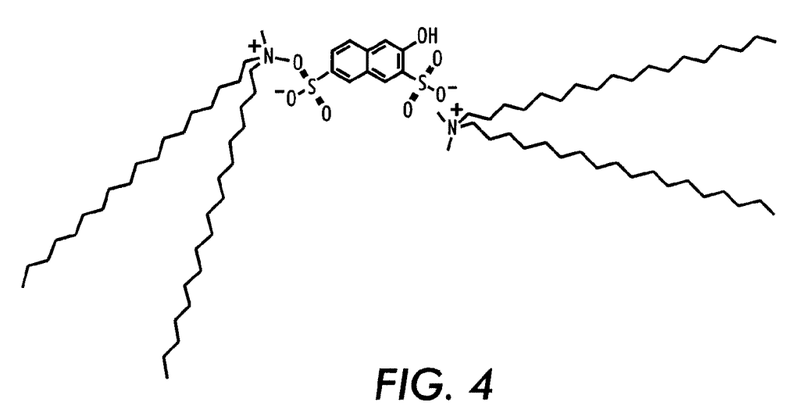
FIG. 4 illustrates a fourth example of a domesticated sulfonated small molecule according to the present embodiments.

The present embodiments address drooling and faceplate staining by using a specific type of compound in the phase change inks as anti-drool additives. Specifically, the present embodiments provide for the use of certain small molecules containing two or three aromatic rings and $SO_3M$ (M=metal) groups as anti-drool additives, such as for example, disulfonated 3-hydroxy naphthalene. In embodiments, M can be selected from the group consisting of monovalent metals, such as Na, K, Li, divalent metals such as Ca, Mg, Ba, Cu, Cd, Zn, Mn and/or trivalent metals such as Al, Cr, and Co. These additives, however, need minor modifications before use in the inks. The metal counterion from the $SO_3^-$ group is replaced by a quaternary ammonium salt that contains long greasy chains to facilitate compatibility with the solid ink vehicle. More specifically, the metal counterion is replaced by a quaternary ammonium salt that contains long greasy chains to enable compatibility with the solid ink vehicle. The sulfonic end groups and the quaternary ammonium end groups interact, exchanging counter ions and promoting an anchoring of the dispersant onto the modified additive surface. The sulfonated modified compounds containing at least two $SO_3$ modifications had a Δ (Drool Pressure) in the range of from about −0.8 to about +0.8 inches of water, which is satisfactory. The addition of these compounds also eliminated fouling of the printhead faceplate. As such, the present embodiments provide small molecules having two or three aromatic rings and $SO_3Me$ groups which are used as anti-drool additives after minor modification. Some examples of the sulfonated small molecules used in the present embodiments are Sulfonated Quinizarin, N,N-dimethyl-dioctadecyl salt (sulfonated quinizarin) (FIG. 1), 2-Naphthalene N,N dimethyl-dioctadecyl (FIG. 2), 1,5-disulfonic naphthalene N,N dimethyl-dioctadecyl salt (FIG. 3), and 3-hydroxy naphthalene-2,7 disulfonic N,N dimethyl-dioctadecyl salt (FIG. 4).

Phase change inks prepared with the sulfonated compounds of the present embodiments were tested for drooling and staining in a Phaser 8860 printer (available from Xerox Corp.). The tested inks demonstrated at least reduced drooling and staining behavior if not complete elimination of such behavior. As such, the anti-drool additive of the present embodiments offers major advantages by preventing or reducing undesirable drooling and staining behavior, thus improving stability of the ink in the printhead, and also allows for the opportunity to use cheaper commercial dyes that could be modified for improved performance in a phase change ink jet printhead.

The sulfonated compounds of the present embodiments are usually sold as sodium salts of the corresponding acid functionality (COO or $SO_3$). Because these off-the-shelf colorants exhibit gelling behavior in phase change ink, the colorants must be modified by replacing the metal counterion with a more suitable N-alkyl/aryl counterion which will allow much improved compatibility with phase change ink components. Suitable N-alkyl/aryl counterions to be used in the modification may be selected from the group consisting of quaternary ammonium $NH_4$, or any alkyl or aryl quaternary ammonium, such as tetramethylammonium, tetraethylammonium, tetrapropylammonium tetrabutylammonium, tetrapentylammonium, tetrahexylammonium, tetraheptylammonium, tetraoctylammonium, tetranonylammonium, tetradecylammonium, tetratradodecylammonium, tetraoctadecylammonium,N,N-dimethyl dioctadecyl, N,N-dimethyl dioctyl, N,N-dimethyl didecyl, N,N,N-trimethyl-1-docosanaminium, behenyl trimethylammonium, N-octadecyltrimethylammonium, and other quaternary ammonium compounds such as ARQUADs, and mixtures thereof.

The quaternary ammonium compounds known as the ARQUADs are primarily alkyltrimethylammonium chlorides and may be represented by the formula R—N(CH$_3$)$_3$Cl wherein R is a long chain alkyl group having at least 8 carbon atoms. These particular quaternary ammonium compounds are marketed by Akzo Nobel N.V. under the trade-name ARQUAD. Examples of suitable ARQUAD materials are: Arquad 316, cocoalkyltrimethylammonium from ARQUAD C-35, didecydimethylammonium from ARQUAD 2.10-50, ARQUAD 2.10-70 HFP, 2.10-80, coco(fractionated) dimethylbenzylammonium from ARQUAD MCB 33, ARQUAD MCB 50, ARQUAD MCB 80, hexadecyltrimethylammonium from ARQUAD 16-29, stearyltrimethylammonium from ARQUAD 18-50, behenyltrimethylammonium from ARQUAD 20-80, or salts thereof. A variety of compounds of this class are available varying as to the length and number of long chain alkyl groups attached to the nitrogen atom. In other embodiments, the N-alkyl or N-aryl counterion is selected from one of the following:

wherein R$_1$, R$_2$ and R$_3$ can be identical or different from one another and each is selected from the group consisting of alkyl, alkoxy, aryl, and alkylaryl and X is any halogen atom. In embodiments, the alkyl, alkoxy, aryl, and alkylaryl groups have equal to or greater than 4 carbon atoms. The quaternary ammonium counter ion can also include alkoxylates such as the following:

Examples include Ethoquad C/12 where R=coco (a complex mixture of unsaturated and saturated C6 to C18 acids from coconut oil) and m+n=2, Ethoquad C/25 where R=coco and m+n=15, Ethoquad O/12 where R=oleyl and m+n=2, all available from Lion Akzo Corporation. The quaternary ammonium counter ion can also be an oligomer such as the following Poly[oxy-1,2-ethanediyl(dimethyliminio)-1,2-ethanediyl (dimethyliminio)-1,2-ethanediylchloride (1:2)] available from Shijiazhuang Guhong Chemicals Co., Ltd. Examples of counter ions containing aryl groups include but are not limited to: benzyltributylammonium bromide, benzyltributylammonium chloride, benzyltriethylammonium chloride, benzyltriethylammonium bromide, benzyltriethylammonium iodide, benzyltrimethylammonium iodide, benzyltrimethylammonium bromide, benzyltrimethylammonium chloride (neat or in solution)]

Dispersants used in the phase change inks include, but are not limited to, those selected from the group consisting of MODAFLOW 2100, available from Cytec Surface Specialties, OLOA 1200, OLOA 11000, OLOA 11001, available from Chevron Oronite Company LLC, IRKASPERSE 2153, 2155, SOLSPERSE 9000, 16000, 17000, 17940, 18000, 19000, 19240, 20000, 36000, 39000, 41000, 54000, available from Lubrizol Corporation) and mixtures thereof. Further, specific dispersants that may be used of which are disclosed in U.S. Pat. No. 7,973,186, which is incorporated herein in its entirety have the following formulas:

or a mixture thereof; wherein R and R' are the same or different, and wherein R and R' are independently selected from an alkyl group, an arylalkyl group, or an alkylaryl group, wherein the alkyl group, the arylalkyl group, or the alkylaryl group has from about 18 to about 60 carbon atoms; and wherein m is an integer of from about 1 to about 30. Exemplary ink compositions may include one or more dispersants and/or one or more surfactants for their known properties, such as controlling wetting properties of the ink composition, and stabilizing pigmented colorants.

The anti-drool additive may be present in the phase change ink in any desired or effective amount to prevent drooling and/or staining, for example, at least from about 0.05 percent by weight of the ink to about 20 percent by weight of the ink, at least from about 0.2 percent by weight of the ink to about 10 percent by weight of the ink, and at least from about 0.5 percent by weight of the ink to about 5 percent by weight of the ink. The dispersant may be present in the phase change ink in an amount of from about 0.1 to about 25 percent by weight of the total weight of the ink. In further embodiments, the dispersant may be present in the phase change ink in an amount of from about 0.2 to about 10, or from about 0.5 to about 6 percent by weight of the total weight of the ink.

The ink of the present embodiments may further include conventional additives to take advantage of the known functionality associated with such conventional additives. Such additives may include, for example, at least one isocyanate derived material, antioxidant, defoamer, slip and leveling agents, clarifier, viscosity modifier, adhesive, plasticizer and the like.

The ink vehicle or carrier may also include at least one isocyanate derived material. The isocyanate derived material may be a urethane resin obtained by reacting two equivalents of an alcohol, such as hydroabietyl alcohol and one equivalent of an isocyanate or diisocyanate (isophorone diisocyanate), as disclosed in, for example, Example 1 of U.S. Pat. No. 5,782,966, the disclosure of which is totally incorporated herein by reference in its entirety. The isocyanate derived material may be present in the ink carrier in an amount of from about 2 to about 99 percent or from about 2 to about 90 percent or from about 3 to about 80 percent by weight of the ink carrier. Other suitable isocyanate-derived materials include a urethane resin that was the adduct of three equivalents of stearyl isocyanate and a glycerol-based alcohol, prepared as described in Example 4 of U.S. Pat. No. 6,309,453, the disclosure of which is totally incorporated herein by reference in its entirety.

The ink may optionally contain antioxidants to protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba Inc.), (2) 2,2-bis(4-(2-(3,5-di-tert-butyl-4-hydroxyhydrocinnamoyloxy)) ethoxyphenyl)propane (TOPANOL-205, available from ICI America Corporation), (3) tris(4-tert-butyl-3-hydroxy-2,6-dimethyl benzyl)isocyanurate (CYANOX 1790, 41, 322-4, LTDP, Aldrich D12, 840-6), (4) 2,2'-ethylidene bis(4,6-di-tert-butylphenyl)fluoro phosphonite (ETHANOX-398, available from Ethyl Corporation), (5) tetrakis(2,4-di-tert-butylphenyl)-4,4'-biphenyl diphosphonite (ALDRICH 46, 852-5; hardness value 90), (6) pentaerythritol tetrastearate (TCI America #P0739), (7) tributylammonium hypophosphite (Aldrich 42, 009-3), (8) 2,6-di-tert-butyl-4-methoxyphenol (Aldrich 25, 106-2), (9) 2,4-di-tert-butyl-6-(4-methoxybenzyl)phenol (Aldrich 23, 008-1), (10) 4-bromo-2,6-dimethylphenol (Aldrich 34, 951-8), (11) 4-bromo-3,5-didimethylphenol (Aldrich B6, 420-2), (12)-4-bromo-2-nitrophenol (Aldrich 30, 987-7), (13) 4-(diethyl aminomethyl)-2,5-dimethylphenol (Aldrich 14, 668-4), (14) 3-dimethylaminophenol (Aldrich ID14, 400-2), (15) 2-amino-4-tert-amylphenol (Aldrich 41, 258-9), (16) 2,6-bis(hydroxymethyl)-p-cresol (Aldrich 22, 752-8), (17) 2,2'-methylenediphenol (Aldrich B4, 680-8), (18) 5-(diethylamino)-2-nitrosophenol (Aldrich 26, 951-4), (19) 2,6-dichloro-4-fluorophenol (Aldrich 28, 435-1), (20) 2,6-dibromo fluoro phenol (Aldrich 26, 003-7), (21) α-trifluoro-o-creso-1 (Aldrich 21, 979-7), (22) 2-bromo-4-fluorophenol (Aldrich 30, 246-5), (23) 4-fluorophenol (Aldrich F1, 320-7), (24) 4-chlorophenyl-2-chloro-1,1,2-tri-fluoroethyl sulfone (Aldrich 13, 823-1), (25) 3,4-difluoro phenylacetic acid (Adrich 29, 043-2), (26) 3-fluorophenylacetic acid (Aldrich 24, 804-5), (27) 3,5-difluoro phenylacetic acid (Aldrich 29, 044-0), (28) 2-fluorophenylacetic acid (Aldrich 20, 894-9), (29) 2,5-bis (trifluoromethyl)benzoic acid (Aldrich 32, 527-9), (30) ethyl-2-(4-(4-(trifluoromethyl)phenoxy)phenoxy)propionate (Aldrich 25, 074-0), (31) tetrakis (2,4-di-tert-butyl phenyl)-4,4'-biphenyl diphosphonite (Aldrich 46, 852-5), (32) 4-tert-amyl phenol (Aldrich 15, 384-2), (33) 3-(2H-benzotriazol-2-yl)-4-hydroxy phenethylalcohol (Aldrich 43, 071-4), NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The ink may further contain an optional viscosity modifier such as FORAL 85, a glycerol ester of hydrogenated abietic (rosin) acid (commercially available from Eastman), FORAL 105, a pentaerythritol ester of hydroabietic (rosin) acid (commercially available from Eastman), CELLOLYN 21, a hydroabietic (rosin) alcohol ester of phthalic acid (commercially available from Eastman), ARAKAWA KE-311 and KE-100 Resins, triglycerides of hydrogenated abietic (rosin) acid (commercially available from Arakawa Chemical Industries, Ltd.), synthetic polyterpene resins such as NEVTAC 2300, NEVTAC 100, and NEVTACO 80 (commercially available from Neville Chemical Company), WINGTACK 86, a modified synthetic polyterpene resin (commercially available from Sartomer), and the like. Viscosity modifiers may be present in the ink in any effective amount, such as from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

Adhesives, such as VERSAMID 757, 759, or 744 (commercially available from Cognis) may be present in the ink from about 0.01 percent by weight of the ink to from about 98 percent by weight of the ink, from about 0.1 percent by weight of the ink to about 50 percent by weight of the ink, from about weight percent of the ink to about 10 weight percent of the ink.

Plasticizers such as UNIPLEX 250 (commercially available from Unitex), the phthalate ester plasticizers commercially available from Ferro under the trade name SANTICIZER, such as dioctyl phthalate, diundecyl phthalate, alkylbenzyl phthalate (SANTICIZER 278), triphenyl phosphate (commercially available from Ferro), KP-140, a tributoxyethyl phosphate (commercially available from Great Lakes Chemical Corporation), MORFLEX 150, a dicyclohexyl phthalate (commercially available from Morflex Chemical Company Inc.), trioctyl trimellitate (commercially available from Sigma Aldrich Co.), and the like. Plasticizers may be present in an amount from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

When present, the optional additives may each, or in combination, be present in the ink in any desired or effective amount, such as from about 1 percent to about 10 percent by weight of the ink or from about 3 percent to about percent by weight of the ink.

In embodiments, the ink carriers for the phase change inks may have melting points of from about 60° C. to about 150° C., for example from about 80° C. to about 120° C., from about 85° C. to about 110° C., from about 100° C. to about 110° C., or from about 105° C. to about 110° C. as determined by, for example, observation and measurement on a microscope hot stage, wherein the binder material is heated on a glass slide and observed by microscope. Higher melting points are also acceptable, although printhead life may be reduced at temperatures higher than 150° C. Furthermore, low energy inks have a jetting viscosity of about 9 cP to about 13 cP, or such as from about 10 cP to about 11 cP at melting points of about 107° C. to about 111° C.

The ink compositions can be prepared by any desired or suitable method. For example, each of the components of the ink carrier can be mixed together, followed by heating, the mixture to at least its melting point, for example from about 60° C. to about 150° C., 80° C. to about 120° C. and 85° C. to about 110° C. The colorant may be added before the ink ingredients have been heated or after the ink ingredients have been heated. When pigments are the selected colorants, the molten mixture may be subjected to milling such as in an attritor or ball mill apparatus or high speed shearing mill, with or without milling media, to effect dispersion of the pigment in the ink carrier. Where ink compositions contain colorants that are pigments, the anti-drool additive may be added before, during or after the pigment dispersion processing step. In those methods where the anti-drool additive is added after the pigment dispersion processing step, the resultant heated mixture may be further processed such as by milling in an attritor, ball mill apparatus, or high speed shearing mill, with or without milling media, or simply stirred, with the addition of the anti-drool additive not being limited by these methods. In embodiments, the heated mixture is stirred for about 5 seconds, for about 2 minutes, for about 10 minutes or more, to obtain a substantially homogeneous, uniform melt, followed by cooling the ink to ambient temperature (typically from about 20° C. to about 25° C.). The inks are solid at ambient temperature. In a specific embodiment, during the formation process, the inks in their molten state are poured into molds and then allowed to cool and solidify to form ink sticks. Suitable ink preparation techniques are disclosed in U.S. Pat. No. 7,186,762, the disclosure of which is incorporated herein by reference in its entirety.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that several of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Several inks and ink bases containing various dispersants with or without modified naphthalene compounds were evaluated for drool in a Typhoon printhead. SOLSPERSE 17000 (available from Lubrizol Corporation) and a dispersant resin as prepared in Example 1 of U.S. Pat. No. 7,973,186 were used as a dispersant for the example data. The ink components are presented in Table 1. The percentages in the ink formulation are based on weight.

TABLE 1

| Ink Base Component | Details |
| --- | --- |
| Polymethylene wax | A fractionated polymethylene wax available from IGI Inc. |
| Polyethylene wax | A fractionated polyethylene wax available from Baker Petrolite |
| Triamide wax | As prepared in Example 1 of U.S. Pat. No. 6,860,930 |
| Kemamide S-180 ® | Stearyl stearamide available from Witco Chemical Corporation |
| KE-100 ® | Triglycerides of hydrogenated abietic acid available from Arakawa Industries |
| Urethane resin | As prepared in example 4 of U.S. Pat. No. 6,309,453 |
| Naugard ® 445 | Antioxidant available from Uniroyal Chemical Company |

The following anti-drool materials (ADM), shown in Table 2, were used in the Examples.

TABLE 2

| Composition | Anti-Drool Material Description | Anti-Drool Material Designation |
|---|---|---|
| Example 1 | N,N-dimethyl dioctedecyl Sulfonated quinizarin | ADM-1 |
| Example 2 | (2-naphthalene N,N-dimethyl dioctedecyl) | ADM-2 |
| Example 3 | (1,5-disulfonic napthtalene N,N-dimethyldioctadecyl) | ADM-3 |
| Example 4 | (3-hydroxy naphthalene 2,7-disulfonated N,N-dimethyldioctadecyl) | ADM-4 |
| Example 5 | (3-hydroxy naphthalene 2,7-disulfonated N,N-dimethyldioctadecyl) | ADM-4 |
| Example 6 | (3-hydroxy naphthalene 2,7-disulfonated N,N-dimethyldioctadecyl) | ADM-4 |
| Example 7 | (3-hydroxy naphthalene 2,7-disulfonated N,N-dimethyldioctadecyl) | ADM-4 |

Comparative Example 1

Preparation of Standard Ink Base

In a 500 mL beaker were introduced 84.9 g (54.16%) polymethylene wax, 20.0 g (12.76%) triamide wax, 28.0 g (17.86%) S180®, 20 g (12.76%) KE-100®, 3.52 g (2.25%) urethane resin, 0.336 g (0.21%) Naugard® 445. The solids were allowed to melt in an oven at 130° C. until all components were molten. The resultant ink base was filtered through a 5 µm mesh.

Comparative Example 2

Preparation of Ink Base with Dispersant Resin (Example 1 of U.S. Pat. No. 7,973,186)

In a 500 mL beaker were introduced 84.9 g (53.08%) a polyethylene wax, 20 g (12.5%) triamide wax, 28 g (17.5%) S180®, 20 g (12.5%) KE-100®, 3.52 g (2.2%) urethane resin, 0.336 g (0.21%) Naugard® 445 and 3.2 g (2%) dispersant resin (Example 1 U.S. Pat. No. 7,973,186). The mixture was allowed to melt in an oven at 130° C. until all components were molten. The resultant mixture was filtered through a 5 µm mesh.

Comparative Example 3

Preparation of Pigmented Ink with Dispersant Resin (Example 1 of U.S. Pat. No. 7,973,186)

The following materials were weighed in a 600 mL beaker such that the accompanying weight percentages also include the pigment, dispersant and pigment synergist that were added in subsequent mixing step: 80.48 g (50.85%) polyethylene wax, 18.51 g (11.57%) triamide wax, 26.66 g (16.66%) S-180®, 18.66 g (11.66%) KE-100®, 1.712 g (1.07%) urethane resin, 0.224 g (0.14%) Naugard® 445 (an antioxidant), and 8.0 g (5%) SOLSPERSE 17000. The materials were melted in an oven at 120° C., mixed well, then transferred to a Szgevari 01 attritor, available from Union Process, that was also heated to 120° C., and charged with 1800 g 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 4.032 g (2.52%) of Pigment Violet 19. The pigmented ink was allowed to attrite at 300 RPM for 18 hours upon which the final attrited mixture was isolated from the stainless steel balls and filtered with a 5 micron stainless steel mesh using a KST-47 filtration apparatus, commercially available from Advantec Corporation.

Comparative Example 4

Preparation of Pigmented Ink with Dispersant Resin (Example 1 of U.S. Pat. No. 7,973,186)

The following materials were weighed in a 600 mL beaker such that the accompanying weight percentages also include the pigment, dispersant and pigment synergist that were added in subsequent mixing step: 82.81 g (51.79%) polymethylene wax, 19.2 g (12.01%) triamide wax, 28.09 g (17.57%) S-180®, 19.2 g (12.01%) KE-100®, 1.712 g (1.07%) urethane resin, 0.224 g (0.14%) Naugard® 445 (an antioxidant), and 3.824 g (2.39%) dispersant resin (Example 1 U.S. Pat. No. 7,973,186). The materials were melted in an oven at 120° C., mixed well, then transferred to a Szgevari 01 attritor, available from Union Process, that was also heated to 120° C., and charged with 1800 g 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 4.032 g (2.52%) of Pigment Mogul L, 0.8 g (0.5%) of Sunflo B124 (Synergist). The pigmented ink was allowed to attrite at 250 RPM for 18 hours upon which the final attrited mixture was isolated from the stainless steel balls and filtered with a 5 micron stainless steel mesh using a KST-47 filtration apparatus, commercially available from Advantec Corporation.

Example 1

Preparation of the Phase Change Ink Base Containing Dispersant Resin (Example 1 of U.S. Pat. No. 7,973,186) and 2.0% Wt Sulfonated Quinizarin, N,N-dimethyl-dioctadecyl In a 500 mL beaker were introduced 83.36 g (51.761%) polymethylene wax, 20.48 g (12.72%) triamide wax, 27.84 g (17.29%) S180®, 20 g (12.42%) KE-100®, 2.62 g (1.63%) urethane resin, 0.336 g (0.21%) Naugard® 445 and 3.2 g (1.99%) dispersant resin (Example 1 U.S. Pat. No. 7,973,186). The mixture was allowed to melt in an oven at 130° C. until all components were molten. When the mixture looked homogenous, 3.2 g (1.99%) of sulfonated quinizarin (N,N-dimethyl-dioctadecyl) was added with stirring. The resultant mixture was filtered through a 5 µm mesh.

Example 2

Preparation of the Phase Change Ink Base Containing Dispersant Resin (Example 1 of U.S. Pat. No. 7,973,186) and 2.0% 2-Naphthalene N,N dimethyl-dioctadecyl In a 500 mL beaker were introduced 83.36 g (51.76%) polymethylene wax, 20.48 g (12.72%) triamide wax, 27.84 g (17.29%) S180®, 20 g (12.42%) KE-100®, 2.62 g (1.63%) urethane resin, 0.336 g (0.21%) Naugard® 445 and 3.2 g (1.99%) dispersant resin (Example 1 U.S. Pat. No. 7,973,186). The mixture was allowed to melt in an oven at 130° C. until all components were molten. When the mixture looked homogenous, 3.2 g (1.99%) of Naphthalene N,N dimethyl-dioctadecyl was added with stirring. The resultant mixture was filtered through a 5 µm mesh.

Example 3

Preparation of the Phase Change Ink Base Containing Dispersant Resin (Example 1 of U.S. Pat. No. 7,973,186) and 2.0% Naphthalene 1,5-disulfonic N,N dimethyl-dioctadecyl In a 500 mL beaker were introduced 83.36 g (51.76%) polymethylene wax, 20.48 g (12.72%) triamide wax, 27.84 g (17.29%) S180®, 20 g (12.42%) KE-100®, 2.62 g (1.63%) urethane resin, 0.336 g (0.21%) Naugard® 445 and 3.2 g (1.99%) dispersant resin (Example 1 U.S. Pat. No. 7,973,186). The mixture was allowed to melt in an oven at 130° C. until all components were molten. When the mixture looked homogenous, 3.2 g (1.99%) of Naphthalene 1,5-disulfonic N,N dimethyl-dioctadecyl was added with stirring. The resultant mixture was filtered through a 5 µm mesh.

Example 4

Preparation of the Phase Change Ink Base Containing Dispersant Resin (Example 1 of U.S. Pat. No. 7,973,186) and 1.0% 3-hydroxy naphthalene-2,7 disulfonic N,N dimethyl-dioctadecyl salt In a 500 mL beaker were introduced 83.36 g (51.76%) polymethylene wax, 20.48 g (12.72%) triamide wax, 27.84 g (17.29%) S180®, 20 g (12.42%) KE-100®, 2.62 g (1.63%) urethane resin, 0.336 g (0.21%) Naugard® 445 and 3.2 g (1.99%) dispersant resin (Example 1 U.S. Pat. No. 7,973,186). The mixture was allowed to melt in an oven at 130° C. until all components were molten. When the mixture looked homogenous, 3.2 g (1.99%) of 3-hydroxy naphthalene-2,7 disulfonic N,N dimethyl-dioctadecyl salt was added with stirring. The resultant mixture was filtered through a 5 µm mesh.

Example 5

Preparation of the Phase Change Ink Base Containing Dispersant Resin (Example 1 of U.S. Pat. No. 7,973,186) and 2.0% 3-hydroxy naphthalene-2,7 disulfonic N,N dimethyl-dioctadecyl salt In a 500 mL beaker were introduced 81.76 g (51.28%) polymethylene wax, 20.48 g (12.85%) triamide wax, 27.84 g (17.46%) S180®, 20 g (12.54%) KE-100®, 2.62 g (1.64%) urethane resin, 0.336 g (0.21%) Naugard® 445 and 3.2 g (2.01%) dispersant resin (Example 1 U.S. Pat. No. 7,973,186). The mixture was allowed to melt in an oven at 130° C. until all components were molten. When the mixture looked homogenous, 3.2 g (2.01%) of 3-hydroxy naphthalene-2,7 disulfonic N,N dimethyl-dioctadecyl salt were added with stirring. The resultant mixture was filtered through a 5 µm mesh.

Example 6

Preparation of the Phase Change Pigmented Ink Containing Dispersant Resin (Example 1 of U.S. Pat. No. 7,973,186) and 2.0% 3-hydroxy naphthalene-2,7 disulfonic N,N dimethyl-dioctadecyl salt Repeat of the ink formulation in Comparative Example 3 with 3.2 g (1.98%) of 3-hydroxy naphthalene-2,7 disulfonic N,N dimethyl-dioctadecyl salt added with stirring to the molten ink. The resultant mixture was filtered through a 5 µm mesh.

Example 7

Preparation of the Phase Change Pigmented Ink Containing Dispersant Resin (Example 1 of U.S. Pat. No. 7,973,186) and 2.0% 3-hydroxy naphthalene-2,7 disulfonic N,N dimethyl-dioctadecyl salt Repeat of the ink formulation in Comparative Example 4 with 3.2 g (1.96%) of 3-hydroxy naphthalene-2,7 disulfonic N,N dimethyl-dioctadecyl salt added with stirring to the molten ink. The resultant mixture was filtered through a 5 µm mesh.

Drool Testing and Results

The drool pressure threshold of a given test ink was determined by first applying the pressure at the range used for the ink base. If drooling was observed, the drooling pressure threshold of that test ink would be determined by applying graduated decreases in pressure. The delta drool pressure of a given test ink was also calculated by the difference of the measured drool pressure thresholds of the reference ink base and the test ink sample.

$$\Delta(\text{Drool Pressure}) = \text{Drool Pressure(sample)} - \text{Drool Pressure(reference)}$$

Thus a test ink having a drool pressure of negative differential inches of water, relative to the ink base from a commercially available ink (serving as a control), drooled at a lower applied pressure that was typically used in the printer.

To assess test ink resistance to drooling, the ink was tested in a Typhoon print head. The print head was emptied by printing 20 duplex solid fills. The channels were refilled with molten ink from an oven, purged, emptied and re-filled until printed solid fills on paper appeared uniform. A pressure of approximately 2.8 inches water was set in the printer so that in a purge/wipe cycle, a quantity of test ink was purged at that pressure and then wiped off the front face from the printhead's wiper blade in the printhead's cleaning or purge/wipe cycle. At this point, the front face of the printer was visually observed as to whether any drooling onto the printhead's front face was initiated and/or persisted. If drooling of a test ink was observed at a certain pressure, then the applied pressure was gradually reduced to a level where drooling of a test ink was not visually observed and this pressure level was recorded as the drool pressure limit of the test ink.

At the completion of the test, the test ink is rinsed out with clear base, usually requiring 4 to 6 fill/purge/empty cycles.

The differential drool pressure, or $\Delta$ (Drool Pressure), of the respective test ink is reported as differential inches of water, with respect to the drooling level of the ink base, and is calculated as follows:

$$\Delta(\text{Drool Pressure of test ink}) = \text{Pigmented Ink failure (inches of water)} - \text{ink base failure(inches of water)}$$

Thus a test ink having negative differential inches of water, relative to the ink base, is drooling at a lower applied pressure. Drool pressure of a sample ink is the gauge pressure realized that causes the ink to burst out of at least some of the nozzles in the printhead which can be accurately measured by a micropressure gauge. The results of the drool test for ink bases and inks are presented in Table 3 below:

TABLE 3

| Example | Sample | Dispersant used | Anti-Drool Material Designation | Drool Pressure (gauge), inches of water | Δ (Drool Pressure), inches of water | Visual Fouling observed on printhead |
|---|---|---|---|---|---|---|
| Comparative 1 | Ink base only | None | Not applicable | 2.31 | 0.0 | No |
| Comparative 2 | Ink base | [1]Custom dispersing compound | Not applicable | 1.59 | −0.64 | Yes |
| Comparative 3 | Magenta ink Pigment Violet 19 | SOLSPERS E 17000 | Not applicable | 0.37 | −1.73 | Yes |
| Comparative 4 | Ink Carbon Black Mogul L pigment synegist SunFlo SFB 124 | [1]Custom dispersing compound | Not applicable | 1.50 | −0.62 | No |
| 1 | Ink base | [1]Custom dispersing compound | ADM-1 | 0.68 | −1.42 | Yes |
| 2 | Ink base | [1]Custom dispersing compound | ADM-2 | 1.29 | −0.82 | Yes |
| 3 | Ink base | [1]Custom dispersing compound | ADM-3 | Not applicable | gelled | Not applicable |
| 4 | Ink base | [1]Custom dispersing compound | ADM-4 | 1.61 | −0.49 | No |
| 5 | Ink base | [1]Custom dispersing compound | ADM-4 | 2.11 | 0 | No |
| 6 | Magenta ink Pigment Violet 19 | SOLSPERS E 17000 | ADM-4 | 1.31 | −0.80 | No |
| 7 | Ink Carbon Black Mogul L pigment | [1]Custom dispersing compound | ADM-4 | 2.42 | 0.00 | No |

[1]Custom dispersing compound prepared according to Example 1 from U.S. Pat. No. 7,973,186

Differential drool pressure values of about −0.8 to about +0.8 inches of water are desirable and indicate a normal range of printhead values for optimum performance over purge/wipe cycles. As can be seen from Table 3, many examples of the present embodiments resulted in drool value of Δ (Drool Pressure) of −0.8 to 0 inches of water which was a significant improvement over the comparative examples which did not incorporate the small molecule modified compound. For instance, Comparative Example 3, which contains SOL-SPERSE 17000, resulted in significant failure as drooling of the printhead and severe fouling were evident. In Example 6, the addition of only 2% modified small compound (3-hydroxy naphthalene 2,7-disulfonated N,N-dimethyldioctadecyl) reduced the Δ (Drool Pressure) value in half. In Example 7, the addition of only 2% modified small compound (3-hydroxy naphthalene 2,7-disulfonated N,N-dimethyldioctadecyl) reduced the Δ (Drool Pressure) value to zero.

SUMMARY

In summary, the present embodiments provide for novel anti-drool additives for use in phase change ink compositions. These additives include several sulfonated small molecules modified to be made compatible with solid ink and formulated in inks. The inventive inks tested for drool showed remarkable improvement in drool performance. For one example, remarkable improvement was seen when the inks contained between from about 1 and about 2% by weight of one of these additives, disulfonated compound 3-hydroxy naphthalene.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A phase change ink composition comprising:
a colorant;
an ink vehicle; and
an anti-drool additive, wherein the anti-drool additive is a compound selected from the group consisting of and mixtures thereof.

2. The phase change ink composition of claim 1, wherein the phase change ink has a Δ (Drool Pressure) in a printer of from 1.5 inches of water to 6.0 inches of water.

3. The phase change ink composition of claim 1 further including additives selected from the group consisting of an isocyanate derived material, antioxidant, defoamer, slip and leveling agents, clarifier, viscosity modifier, adhesive, plasticizer, and mixtures thereof.

4. The phase change ink composition of claim 1 having a drool pressure in a printer of at least 1.5 inches of water.

5. The phase change ink composition of claim 1 having a drool pressure in a printer of from 1.5 inches of water to 4.0 inches of water.

6. The phase change ink composition of claim 1 exhibiting little to no staining through visual observation.

7. The phase change ink composition of claim 1, wherein the anti-drool additive is present in the phase change ink composition in an amount of from 0.1 to 20 percent by weight of the total weight of the phase change ink composition.

8. The phase change ink composition of claim 7, wherein the anti-drool additive is present in the phase change ink composition in an amount of from 0.2 to 20 percent by weight of the total weight of the phase change ink composition.

9. The phase change ink composition of claim 7, wherein the anti-drool additive is present in the phase change ink composition in an amount of from 0.5 to 10 percent by weight of the total weight of the phase change ink composition.

10. The phase change ink composition of claim 1 further comprising a dispersant selected from the group consisting of polyethyleneimines, polymers containing quaternary ammonium salts, polymers containing polyalkylated succinimides, and mixtures thereof.

11. The phase change ink composition of claim 10, wherein the dispersant is present in the phase change ink composition in an amount of from 0.1 to 25 percent by weight of the total weight of the phase change ink composition.

12. The phase change ink composition of claim 11, wherein the dispersant is present in the phase change ink composition in an amount of from 0.5 to 10 percent by weight of the total weight of the phase change ink composition.

13. The phase change ink composition of claim 11, wherein the dispersant is present in the phase change ink composition in an amount of from about 1 to 6 percent by weight of the total weight of the phase change ink composition.

\* \* \* \* \*